(12) United States Patent
Basu et al.

(10) Patent No.: US 12,341,224 B2
(45) Date of Patent: Jun. 24, 2025

(54) FUEL CELL STACK ASSEMBLY INCLUDING HEAT SINK INSERTS

(71) Applicant: BLOOM ENERGY CORPORATION, San Jose, CA (US)

(72) Inventors: Nilanjana Basu, Santa Clara, CA (US); Michael Petrucha, Santa Clara, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/052,799

(22) Filed: Nov. 4, 2022

(65) Prior Publication Data

US 2023/0307668 A1    Sep. 28, 2023

Related U.S. Application Data

(60) Provisional application No. 63/269,876, filed on Mar. 24, 2022.

(51) Int. Cl.
| | | |
|---|---|---|
| *H01M 8/0267* | (2016.01) | |
| *H01M 8/00* | (2016.01) | |
| *H01M 8/021* | (2016.01) | |
| *H01M 8/0217* | (2016.01) | |
| *H01M 8/0232* | (2016.01) | |

(Continued)

(52) U.S. Cl.
CPC ......... *H01M 8/0267* (2013.01); *H01M 8/006* (2013.01); *H01M 8/021* (2013.01); *H01M 8/0219* (2013.01); *H01M 8/0232* (2013.01); *H01M 8/04007* (2013.01); *H01M 8/04074* (2013.01); *H01M 8/1246* (2013.01); *H01M 8/2425* (2013.01); *H01M 8/2428* (2016.02); *H01M 8/2432* (2016.02); *H01M 8/2465* (2013.01); *H01M 8/2475* (2013.01); *H01M 8/2484* (2016.02); *H01M 8/249* (2013.01); *H01M 2008/1293* (2013.01)

(58) Field of Classification Search
None
See application file for complete search history.

(56) References Cited

U.S. PATENT DOCUMENTS 4,761,350 A * 8/1988 Ide ..................... H01M 8/2483
429/49
8,563,180 B2   10/2013 Perry et al.
(Continued)

OTHER PUBLICATIONS

Khan Academy, What is thermal conductivity?, Khan Academy, Dec. 9, 2015 (Year: 2015).*

(Continued)

*Primary Examiner* — Ula C Ruddock
*Assistant Examiner* — Mary Grace Byram
(74) *Attorney, Agent, or Firm* — THE MARBURY LAW GROUP PLLC

(57) ABSTRACT

A fuel cell column includes a plurality of fuel cell stacks, at least one fuel manifold configured to provide fuel to the plurality of fuel cell stacks, and at least one heat sink insert located between adjacent fuel cells of the plurality of fuel cell stacks. A fuel cell column including at least one heat sink insert located between adjacent fuel cell stacks of the column may reduce the peak temperatures of the fuel cell stacks adjacent to the heat sink inserts and may provide a smaller temperature distribution within the fuel cell stacks and within the column as a whole.

20 Claims, 5 Drawing Sheets

(51) Int. Cl.
  *H01M 8/04007* (2016.01)
  *H01M 8/1246* (2016.01)
  *H01M 8/2425* (2016.01)
  *H01M 8/2428* (2016.01)
  *H01M 8/2432* (2016.01)
  *H01M 8/2465* (2016.01)
  *H01M 8/2475* (2016.01)
  *H01M 8/2484* (2016.01)
  *H01M 8/249* (2016.01)
  *H01M 8/12* (2016.01)

(56) References Cited

U.S. PATENT DOCUMENTS

| | | | |
|---|---|---|---|
| 8,785,074 | B2 | 7/2014 | Edmonston et al. |
| 10,211,479 | B2 | 2/2019 | Edmonston et al. |
| 10,511,047 | B2 | 12/2019 | Armstrong et al. |
| 10,566,646 | B2 | 2/2020 | Ashary et al. |
| 10,916,793 | B2 | 2/2021 | Edmonston et al. |
| 11,271,240 | B2 | 3/2022 | Edmonston et al. |
| 11,374,232 | B2 | 6/2022 | Patel et al. |
| 2005/0263393 | A1* | 12/2005 | Paz ................ H01M 8/04305 429/444 |
| 2007/0196704 | A1 | 8/2007 | Valensa et al. |
| 2010/0068563 | A1* | 3/2010 | Sanderson ........ H01M 8/04074 165/104.26 |
| 2012/0196194 | A1 | 8/2012 | Perry et al. |
| 2013/0196196 | A1* | 8/2013 | Obeidi ................ H01M 10/443 429/82 |
| 2015/0030949 | A1* | 1/2015 | Ishikawa ............ H01M 8/0258 429/434 |
| 2016/0226093 | A1 | 8/2016 | Edmonston et al. |
| 2017/0222236 | A1* | 8/2017 | Armstrong ............ C22C 19/058 |
| 2019/0051923 | A1 | 2/2019 | Ashary et al. |
| 2019/0109345 | A1 | 4/2019 | Edmonston et al. |
| 2019/0148759 | A1* | 5/2019 | Armstrong ............ H01M 8/247 429/459 |
| 2019/0393522 | A1* | 12/2019 | Feldman ............ H01M 8/2404 |
| 2020/0381762 | A1* | 12/2020 | Edmonston ......... H01M 8/2484 |
| 2021/0025022 | A1* | 1/2021 | Hatano ................ C21D 6/005 |
| 2021/0351420 | A1 | 11/2021 | Patel et al. |

OTHER PUBLICATIONS

Meganathan, Numerical analysis of passive heat sink for different shape, Apr. 6, 2021, Materials Today: Proceedings 46 (2021), 3749-3755 (Year: 2021).*

China National Intellectual Property Administration ("CNIPA"), First Rectification Notification for PRC (China) Patent Application No. 202222940317.6, mailed Feb. 2, 2023, 2 pages.

China National Intellectual Property Administration ("CNIPA") Office Communication, First Rectification Notification from the CNIPA for PRC (China) Patent Application No. 202222940317.6, mailed May 19, 2023.

European Patent Office Communication, Extended European Search Report for EP Application No. 22205435.5, mailed Jan. 31, 2024, 8 pages.

* cited by examiner

FUEL CELL STACK ASSEMBLY INCLUDING HEAT SINK INSERTS

FIELD

The present disclosure is directed to fuel cell systems in general and to a fuel cell stack assembly having heat sink inserts in particular.

BACKGROUND

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel and air has to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

SUMMARY

According to various embodiments of the present disclosure, a fuel cell column includes a plurality of fuel cell stacks, at least one fuel manifold configured to provide fuel to the plurality of fuel cell stacks, and at least one heat sink insert located between adjacent fuel cell stacks of the plurality of fuel cell stacks.

In various embodiments, a fuel cell column including at least one heat sink insert located between adjacent fuel cell stacks of the column may reduce the peak temperatures of the fuel cell stacks adjacent to the heat sink inserts and may provide a smaller temperature distribution within the fuel cell stacks and the column as a whole.

DETAILED DESCRIPTION

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
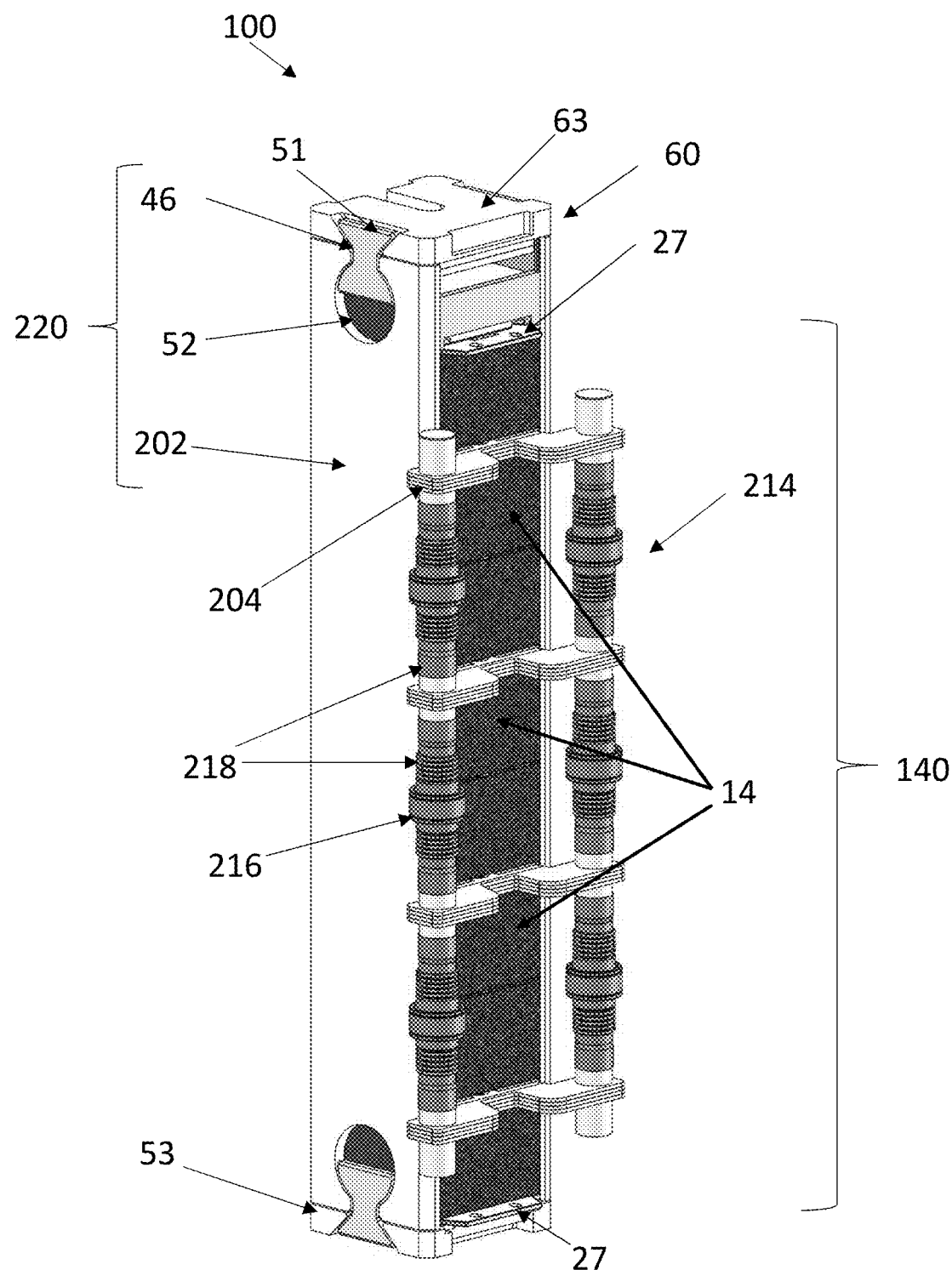
FIG. 1 is a three-dimensional view of a prior art fuel cell stack assembly.

FIG. 1 illustrates a prior art fuel cell stack assembly 100 which is described in U.S. Patent Application Publication No. 2021/0351420 A1, incorporated herein by reference in its entirety. Referring to FIG. 1, the fuel cell stack assembly 100 includes a fuel cell stack column 140, side baffles 220 disposed on opposing sides of the column 140, a lower block 53, and a compression assembly 60 including an upper block 63. In the example fuel cell stack assembly 100 shown in FIG. 1, the column 140 includes eight fuel cell stacks 14, fuel manifolds 204 disposed between the fuel cell stacks 14, and termination plates 27 disposed on opposing ends of the column 140. The fuel cell stacks 14 include a plurality of fuel cells stacked upon one another and separated by interconnects. The interconnects may provide electrical interconnection between the fuel cell stacks, and may also separate fuel, such as a hydrocarbon fuel, flowing to the fuel electrode of one cell in the stack from oxidant, such as air, flowing to the air electrode of an adjacent cell in the stack. The interconnects may also include gas flow passages or channels formed in the surfaces of the interconnects for providing fuel and oxidant flows across the electrodes of the respective fuel cell stacks. At either end of the stack may be endplates (e.g., an air endplate and a fuel endplate) for providing air or fuel, respectively, to the end electrodes of the stack. The outer surfaces of the endplates may be substantially flat, and may abut another component of the fuel cell stack assembly 100, such as a fuel manifold 204 or another fuel cell stack 14 of the column 140. In many cases, the end plates and interconnects of the SOFC stack are made of a chromium-based alloy, such as a Cr—Fe alloy, made by a powder metallurgy technique. The materials and processing conditions for fabricating the interconnects and end plates are typically selected such that the finished interconnect/end plates provide a good thermal match with other components of the SOFC, particularly the solid oxide electrolyte material of the fuel cells. A typical chromium-alloy interconnect/end plate may comprise at least about 80% chromium, and preferably more than about 90% chromium, such as about 94-96% (e.g., 95%) chromium by weight. The interconnect/end plate may contain less than about 20% iron, and preferably less than about 10% iron, such as about 4-6% (e.g., 5%) iron by weight. The interconnect/end plate may contain less than about 2%, such as about zero to 1% of other materials, such as yttrium or yttria, as well as residual or unavoidable impurities. A plurality of the fuel cell stack assemblies 100 may be attached to a base.

An exemplary fuel manifold 204 is described in the U.S. Pat. No. 10,511,047, hereby incorporated by reference in its entirety. Any number of fuel manifolds 204 may be provided between adjacent end plates of adjacent fuel cells of the fuel cell stacks 14, as desired.

The side baffles 220 connect the upper block 63 of the compression assembly 60 and the lower block 53. The side baffles 220, the compression assembly 60, and the lower block 53 may be collectively referred to as a "stack housing". The stack housing is configured to apply a compressive load to the column 140. The configuration of the stack housing eliminates costly feed-throughs and resulting tie rod heat sinks and uses the same part (i.e., side baffle 220) for two purposes: to place the load on the stacks 14 and to direct the cathode feed flow stream (e.g., for a ring shaped arrangement of stacks, the cathode inlet stream, such as air or another oxidizer may be provided from a manifold outside the ring shaped arrangement through the stacks and the exit as a cathode exhaust stream to a manifold located inside the ring shaped arrangement). The side baffles 220 may also electrically isolate the fuel cell stacks 14 from metal components in the system. The load on the column 140 may be provided by the compression assembly 60, which is held in place by the side baffles 220 and the lower block 53. In other words, the compression assembly 60 may bias the stacks 14 of the column 140 towards the lower block 53.

The side baffles 220 may be plate-shaped rather than wedge-shaped and include baffle plates 202 and ceramic inserts 46 configured to connect the baffle plates 202 to the lower block 53 and the compression assembly 60. In particular, the baffle plates 202 include generally circular cutouts 52 in which the inserts 46 are disposed. The inserts 46 do not completely fill the cutouts 52. The inserts 46 are generally bowtie-shaped, but include flat edges 51 rather than fully rounded edges. Thus, an empty space remains in the respective cutouts 52 above or below the inserts 46.

Generally, the side baffles 220 are made from a high-temperature tolerant material, such as alumina or other suitable ceramic. In various embodiments, the side baffles 220 are made from a ceramic matrix composite (CMC). The CMC may include, for example, a matrix of aluminum oxide (e.g., alumina), zirconium oxide or silicon carbide. Other matrix materials may be selected as well. The fibers may be made from alumina, carbon, silicon carbide, or any other suitable material. The lower block 53 and the compression assembly 60 may also be made of the same or similar materials.

Any combination of the matrix and fibers may be used. Additionally, the fibers may be coated with an interfacial layer designed to improve the fatigue properties of the CMC. If desired, the CMC baffles may be made from a unitary piece of CMC material rather than from individual interlocking baffle plates. The CMC material may increase the baffle strength and creep resistance. If the baffles are made from alumina or an alumina fiber/alumina matrix CMC, then this material is a relatively good thermal conductor at typical SOFC operating temperatures (e.g., above 700° C.). If thermal decoupling of neighboring stacks or columns is desired, then the baffles can be made of a thermally insulating ceramic or CMC material.

Other elements of the compression housing, such as the lower block 53 and the compression assembly 60 may also be made of the same or similar materials. For example, the lower block 53 may comprise a ceramic material, such as alumina or CMC, which is separately attached (e.g., by the inserts, dovetails or other implements) to the side baffles 220 and to a system base. The use of the ceramic block material minimizes creation of heat sinks and eliminates the problem of linking the ceramic baffles to a metal base, which introduces thermal expansion interface problems.

Fuel rails 214 (e.g., fuel inlet and outlet pipes or conduits) connect to fuel manifolds 204 located between the stacks 14 in the column 140. The fuel rails 214 may include ceramic tubes 216 brazed to metal tubes 218. The metal tubes 218 may comprise compressible bellows tubes in one embodiment. The fuel cell rails 214 are used to deliver fuel to each pair of stacks 14 in a column 140 of fuel cell stacks via fuel cell manifolds 204. In these systems, the ceramic tubes 216 are located between adjacent fuel manifolds 204 to prevent shorting between adjacent fuel manifolds 204 of the column 140. Alternatively, dielectric material separators may be provided between the fuel manifolds 204 and the adjacent fuel cell stacks 14, and jumpers may be used to allow current to flow between the adjacent fuel cell stacks 14 without flowing through the fuel manifold 204, as is discussed in the U.S. Patent Application Publication No. 2021/0351420 A1. In such embodiments, the fuel rails 214 may be made entirely of metal, not requiring dielectric (e.g., ceramic) tubes 216 which may be omitted. In one embodiment, the fuel rails 214 comprise only the metal bellows 218 and straight metal tubes.

In a fuel cell stack assembly 100 such as shown in FIG. 1, the temperature of the fuel cell stacks 14 is not uniform. The highest temperatures within the fuel cell stacks 14 are often at the interface between the fuel stack 14 and an adjacent fuel cell stack 14 (i.e., at a stack-to-stack interface). The peak temperatures in the fuel cell stacks 14 can sometimes approach, or in some cases exceed, the safe temperature limit for stack seals, which may be around 880° C. for solid oxide fuel cell stacks. Peak stack temperatures exceeding the safe temperature limit may result in seal failures, which can lead to cell performance drop and reduced lifetime for the fuel cell stack assembly 100. In addition, excessive temperatures near the stack-to-stack interface may result in undesirable variations of fuel utilization (FU) throughout the fuel cell column 140.

Various embodiments of the present disclosure are directed to a fuel cell stack assembly that includes one or more heat sink inserts located between adjacent fuel cell stacks of the assembly. In various embodiments, the fuel cell stack assembly may include a fuel cell stack column including a plurality of fuel cell stacks, and at least one heat sink insert disposed between adjacent fuel cell stacks of the column. In embodiments, some of the adjacent fuel cell stacks of the column may be separated by fuel manifolds, while the remainder of the adjacent fuel cell stacks of the column may be separated by a heat sink insert. The heat sink inserts according to various embodiments may reduce the peak temperatures of the fuel cell column adjacent to the heat sink inserts and may provide a smaller temperature distribution within the fuel cell stacks and within the column as a whole.

Figure 2:
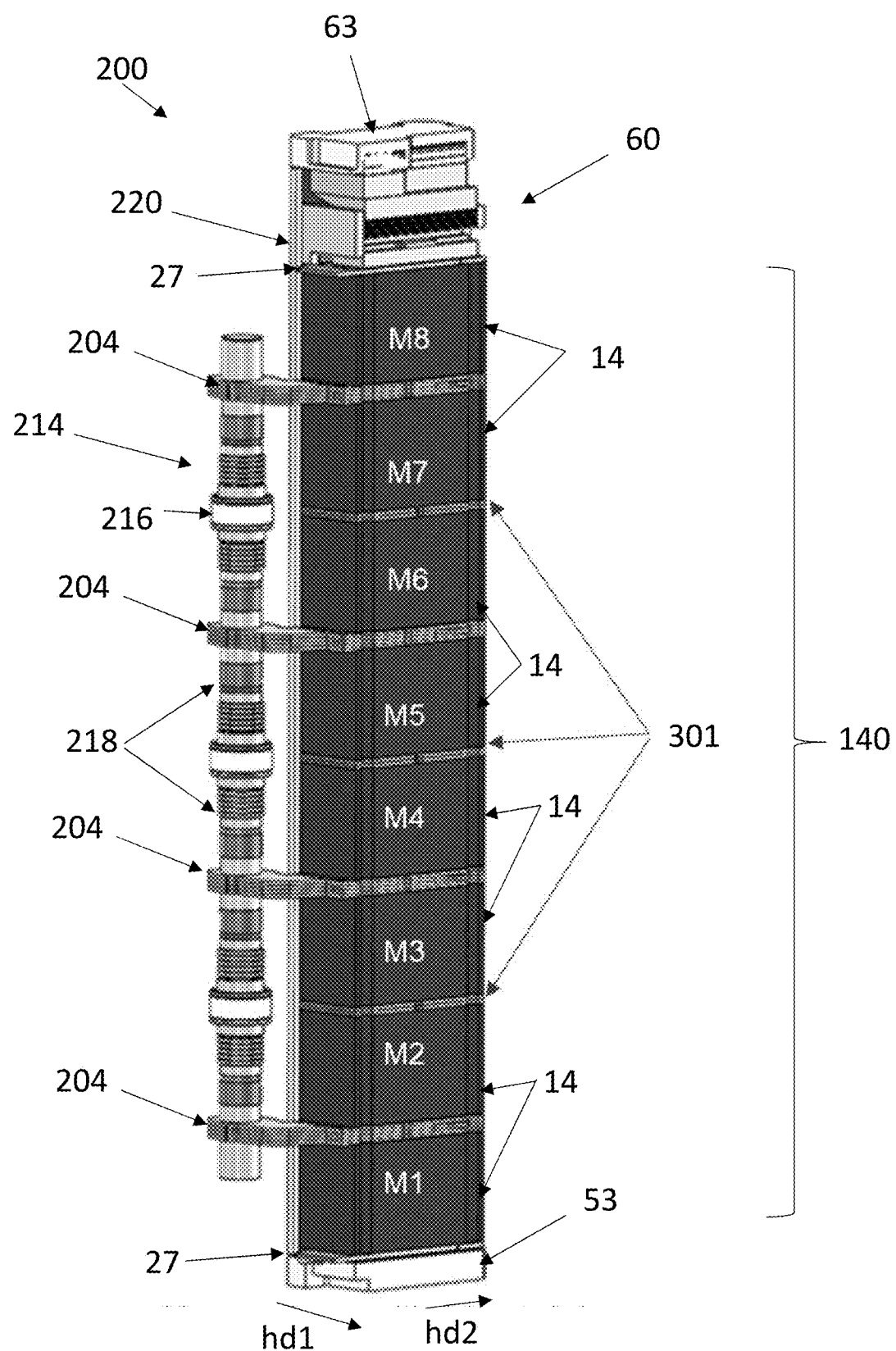
FIG. 2 is a three-dimensional sectional view of a fuel cell stack assembly including heat sink inserts according to an embodiment of the present disclosure.

FIG. 2 is a three-dimensional sectional view of a fuel cell stack assembly 200 according to an embodiment of the present disclosure. The three-dimensional sectional view of FIG. 2 is taken along the vertical centerline of the fuel cell stack assembly 200. The fuel cell stack assembly 200 shown in FIG. 2 may be similar to the assembly 100 shown in FIG. 1, and may include a fuel cell stack column 140, side baffles 220 disposed on opposing sides of the column 140, a lower block 53, and a compression assembly 60 including an upper block 63. In the example fuel cell stack assembly 100 shown in FIG. 2, the column 140 includes eight fuel cell stacks 14, which are labeled M1 through M8. Termination plates 27 may be disposed on opposing ends of the column 140.

Referring again to FIG. 2, the fuel cell stack assembly 200 includes fuel manifolds 204 and heat sink inserts 301 disposed between fuel cell stacks 14 in the column 140. In the embodiment shown in FIG. 2, the fuel cell stack assembly 200 includes four fuel manifolds, which are located between stacks M1 and M2, between stacks M3 and M4, between stacks M5 and M6, and between stacks M7 and M8, respectively. The fuel cell stack assembly 200 additionally includes three heat sink inserts 301 which are disposed between stacks M2 and M3, between stacks M4 and M5, and between stacks M6 and M7, respectively. Thus, each fuel cell stack 14 of the column 140 is located adjacent to a fuel manifold 204 on one side of the fuel cell stack 14 and is adjacent to either a heat sink insert 301 or a termination plate 27 on the opposite side of the fuel cell stack 14.

Each of the heat sink inserts 301 may be located at a stack-to-stack interface between a pair of fuel cell stacks 14 of the column 140. The heat sink inserts 301 may have a first major surface that contacts an end plate of a first fuel cell stack 14 and a second major surface that contacts an end plate of a second fuel cell stack 14. The heat sink inserts 301 may be composed of a suitable thermally-conductive material, such as a metal or metal alloy. In some embodiments, the heat sink inserts 301 may be composed of a chromium-iron alloy. In one non-limiting embodiment, the heat sink inserts 301 may include a chromium-iron alloy having more than about 80% chromium by weight, including more than about 90% chromium by weight, such as about 94-96% (e.g., 95%) chromium by weight, and greater than zero but less than about 20% iron by weight, including less than about 10% iron by weight, such as about 4-6% (e.g., 5%) iron by weight, and less than about 2% by weight, such as zero to 1% by weight of other materials, such as yttrium or yttria, as well as residual or unavoidable impurities. Thus, in one embodiment, the heat sink inserts 301 may be made of the same material (i.e., the above described Cr—Fe alloy) as the interconnects in the fuel cell stacks 14. However, the heat sink inserts 301 may be thicker than the interconnects to increase heat dissipation. Alternatively, the heat sink inserts 301 may include a stainless steel material, such as grade 446 stainless steel (SS446). Other suitable materials for the heat sink inserts 301 are within the contemplated scope of disclosure.

Each of the heat sink inserts 301 may include a block of a thermally conductive material. The block of thermally conductive material may be a single, unitary piece, or may be comprised of multiple pieces that may optionally be welded or otherwise adhered or attached together to form the heat sink insert 301. In some other embodiments, described in further detail below with respect to FIG. 4, the heat sink inserts 301 may have a segmented structure such that separate pieces forming the insert 301 are not attached to each other may be able to "float" independently of one another. In various embodiments, each heat sink insert 301 may have a thickness dimension (i.e., height) between the adjacent fuel cell stacks 14 that is between about 1 and 10 mm, such as between about 3 and 7 mm, including between 5 and 6 mm (e.g., 5.4 mm). The thickness of each heat sink insert 301 may be a function of the number of inserts 301 in the column 140 and the height of the column 140 (e.g., a maximum height of the column 140 that can fit into an assembly enclosure, such as a "hot box").

The heat sink inserts 301 may have a width dimension along a first horizontal direction (i.e., hd1 in FIG. 2) that enables the heat sink inserts 301 to fit between the side baffles 220 of the fuel cell stack assembly 200. In some embodiments, the width dimensions of the heat sink inserts 301 may be substantially the same as the width dimensions of the adjacent fuel cell stacks 14. The heat sink inserts 301 may also include a length dimension along a second horizontal direction (i.e., hd2 in FIG. 2). In some embodiments, the length dimensions of the heat sink inserts 301 may be substantially the same as the width dimensions of the adjacent fuel cell stacks 14.

Figure 3:
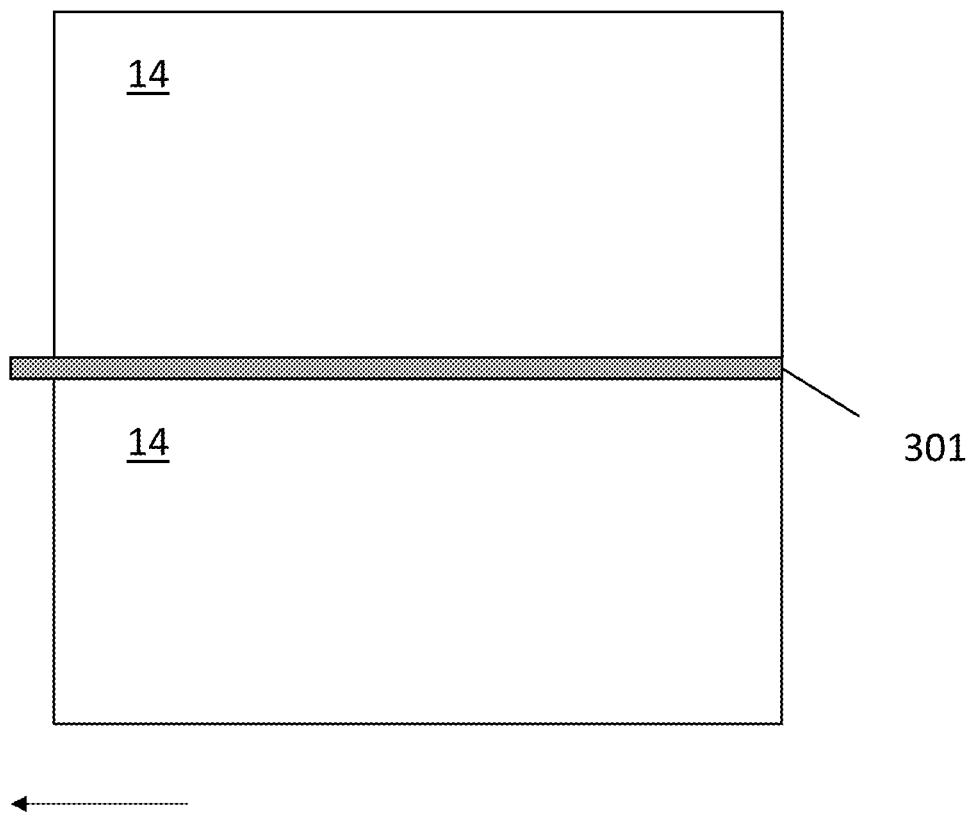
FIG. 3 is a side cross-sectional view of a portion of the fuel cell stack assembly including two fuel cell stacks and one heat sink insert according to an embodiment of the present disclosure.

Alternatively, as shown in FIG. 3, the length dimensions along a second horizontal direction (hd2) of the heat sink inserts 301 may be greater than the length dimensions of the fuel cell stacks 14, such that the heat sink inserts 301 may extend laterally out beyond the side surfaces of the fuel cell stacks 14. The view shown in FIG. 3 may be along the vertical plane which includes the second horizontal direction (hd2). However, since the ceramic baffle plates 202 are located on the other two sides of the column 140, the heat sink inserts 310 have a width dimension between the ceramic baffle plates 202 that is the same as a respective width dimension of the adjacent fuel cell stacks 14 between the ceramic baffle plates 202.

It is estimated that a temperature reduction of about 8-10° C. may be obtained at the stack-to-stack interfaces of the column 140 having heat sink inserts 301 between the adjacent fuel cell stacks 14 compared to the column 140 which lacks the heat sink inserts. It is also estimated that the embodiment column 140 including heat sink inserts 301 should have a lower maximum temperature and a tighter temperature distribution than the comparative column which lacks heat sink inserts 301. In addition, it is estimated that the peak temperatures within the stacks of the embodiment column are in the middle regions of the stacks rather than at the stack-to-stack interfaces as is the case for the comparative column.

The reduction in overall peak temperatures in the embodiment column may help to minimize or eliminate seal failures in the column. In addition, the reduction in maximum column temperatures, tighter temperature distribution within the column, as well as the shift of peak stack temperatures from the stack-to-stack interface region to the middle region of the stacks may improve the fuel distribution throughout the fuel cell stacks of the column. This may enable operation of the column at higher fuel utilization and improve the efficiency of the fuel cell stack assembly.

Figure 4:
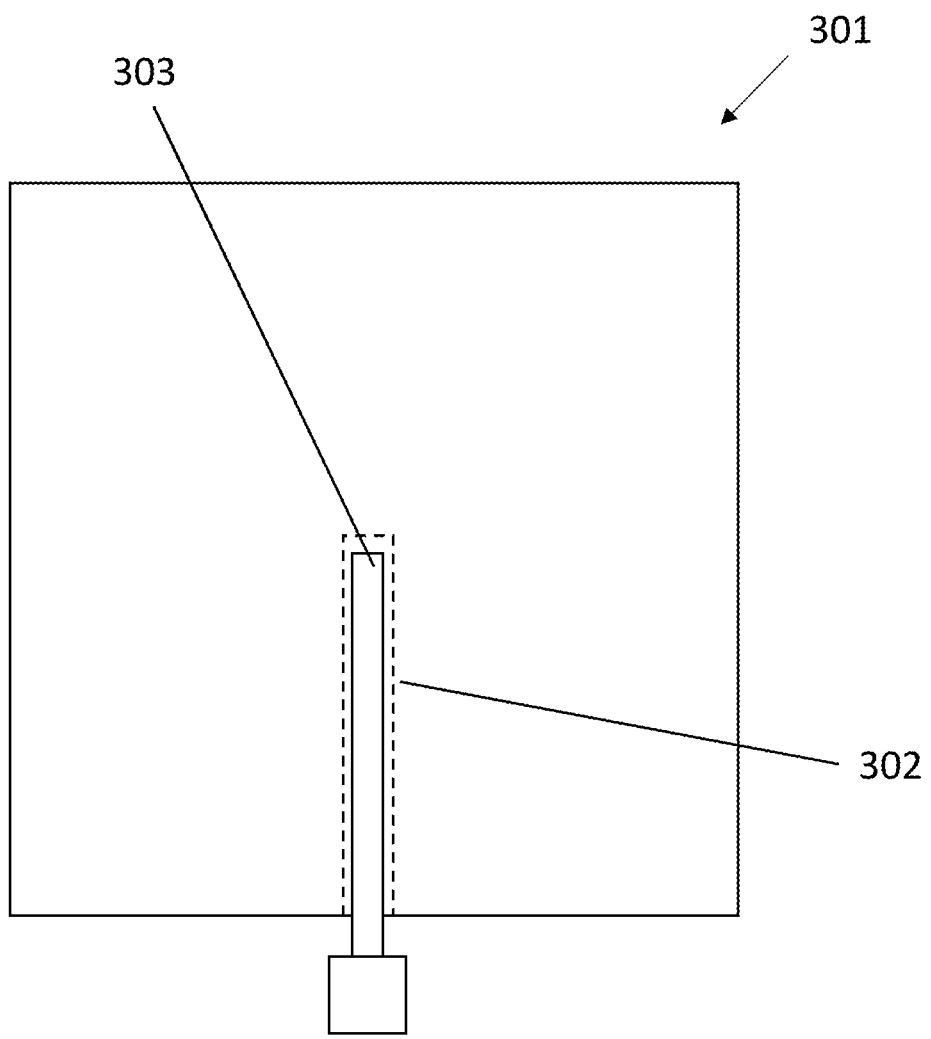
FIG. 4 is a top view of a heat sink insert for a fuel cell stack column according to one embodiment of the present disclosure

FIG. 4 is a top view of a heat sink insert 301 for a fuel cell stack column according to one embodiment of the present disclosure. The heat sink insert 301 of FIG. 4 includes an open region 302 (indicated by dashed lines in FIG. 4), such as a slot or groove formed in a surface of the insert 301, or an internal opening within the insert 301, which extends from the periphery of the heat sink insert 301 to a central region of the heat sink insert 301. A temperature sensor 303, such as a thermocouple, may be provided within the open region 302 in the heat sink insert 301. The temperature sensor 303 may detect temperatures in the central region of the column 140, which may provide an indication of the core temperature(s) of the adjacent fuel cell stacks 14. Providing a temperature sensor 303 in the central region of the heat sink insert 301 provides improved monitoring of fuel cell stack temperature under varying operating conditions and parameters and may provide enhanced control of fuel cell stack operation.

Figure 5:
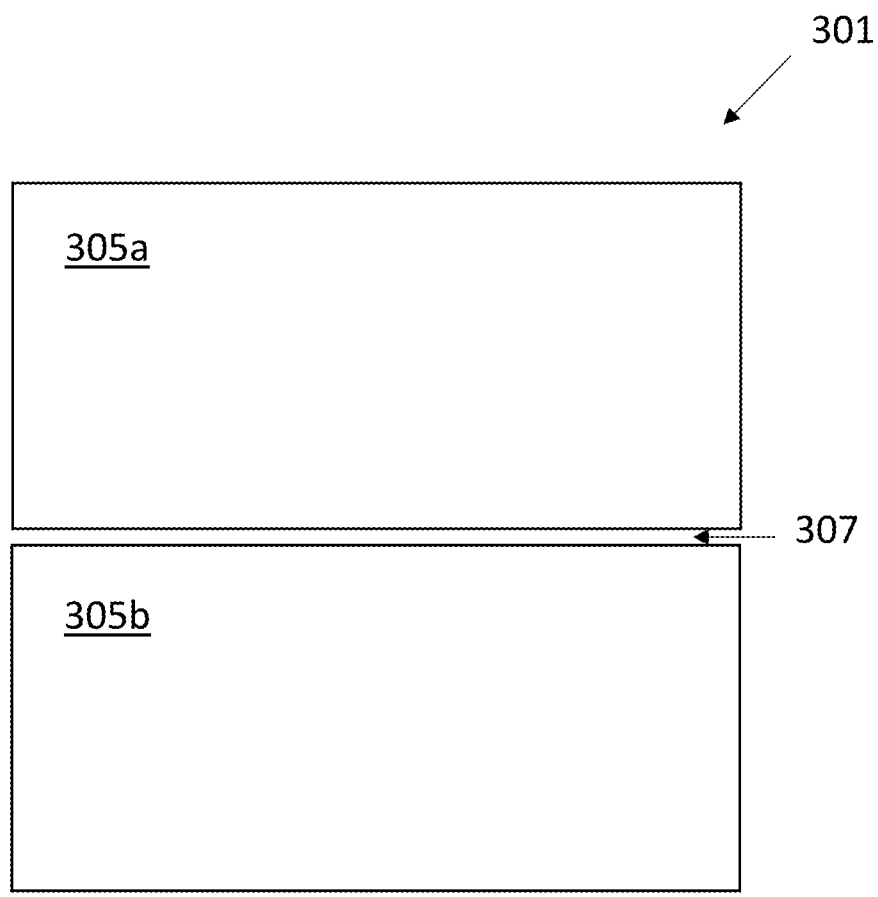
FIG. 5 is a top view of a heat sink insert for a fuel cell stack column according to another embodiment of the present disclosure.

FIG. 5 is a top view of a heat sink insert 301 for a fuel cell stack column according to another embodiment of the present disclosure. The heat sink insert 301 of FIG. 5 includes a segmented construction including a plurality of separate pieces 305a, 305b separated by an expansion zone 307. A heat sink insert 301 having a segmented construction may include any number of separate pieces 305 (e.g., two or more) which may have any suitable size and/or shape. The expansion zone 307 may be an empty space between pieces 305a, 305b, a sealing material filled space, or the interface where the sidewalls of the separate pieces 305a, 305b contact each other. In some embodiments, the separate pieces 305a and 305b of the heat sink insert 301 may not be connected to each other to allow the separate pieces 305a and 305b to "float" independent of one another. This may help to reduce thermal stresses applied to the adjacent fuel cell stacks during thermal cycling.

Fuel cell systems of the embodiments of the present disclosure are designed to reduce greenhouse gas emissions and have a positive impact on the climate.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A fuel cell column, comprising:
    a plurality of fuel cell stacks;
    at least one fuel manifold configured to provide fuel to the plurality of fuel cell stacks; and
    at least one heat sink insert located between adjacent fuel cell stacks of the plurality of fuel cell stacks, wherein:
    the adjacent fuel cell stacks comprise a first fuel cell stack located above a second fuel cell stack;
    the first fuel cell stack comprises a first end plate located at a bottom of the first fuel cell stack;
    the second fuel cell stack comprises a second end plate located at a top end of the second fuel cell stack, wherein the first end plate and the second end plate are composed of the same material;
    the at least one heat sink insert comprises a first heat sink insert which is located between the first end plate of the first fuel cell stack and the second end plate of the second fuel cell stack;
    the first heat sink insert has a first major surface that physically contacts the first end plate of the first fuel cell stack and a second major surface that physically contacts the second end plate of the second fuel cell stack; and
    the first heat sink insert has an open region comprising an internal opening within the first heat sink insert extending from a periphery of the heat sink insert to a central region of the heat sink insert.

2. The fuel cell column of claim 1, wherein the at least one heat sink insert consists essentially of a single unitary piece block of thermally conductive material that contacts a first fuel cell stack on a first side of the heat sink insert and a second fuel cell stack on a second side of the heat sink insert.

3. The fuel cell column of claim 2, wherein the at least one heat sink insert comprises a chromium-iron alloy.

4. The fuel cell column of claim 3, wherein the chromium-iron alloy contains at least 80% chromium by weight, greater than zero and less than 20% iron by weight, and zero to less than 2% by weight of at least one of yttria or yttrium.

5. The fuel cell column of claim 2, wherein the at least one heat sink insert comprises a stainless steel.

6. The fuel cell column of claim 1, wherein the at least one heat sink insert has at least one of a length dimension and a width dimension that is the same as a respective length dimension and a width dimension of the adjacent fuel cell stacks of the column.

7. The fuel cell column of claim 1, wherein the fuel cell column comprises a plurality of fuel manifolds and a plurality of heat sink inserts located between the plurality of the fuel cell stacks, and each fuel cell stack of the plurality of fuel cell stacks contacts at least one of the plurality of the fuel manifolds and the heat sink inserts.

8. The fuel cell column of claim 7, wherein the at least one heat sink insert is located between two of the plurality of the fuel manifolds at an interface between adjacent two of the plurality of the fuel cell stacks.

9. The fuel cell column of claim 8, wherein the plurality of fuel cell stacks are located between a pair of termination plates, and each fuel cell stack of the plurality of fuel cell stacks contacts a fuel manifold on one side of the fuel cell stack, and contacts either a heat sink insert or a termination plate on the opposite side of the fuel cell stack.

10. The fuel cell column of claim 1, further comprising a temperature sensor disposed in the open region.

11. The fuel cell column of claim 1, wherein the at least one heat sink insert comprises a heat sink insert comprising first and second separate pieces separated by an expansion zone.

12. The fuel cell column of claim 1, wherein the at least one heat sink insert has a thickness between 1 and 10 mm between the first side and the second side of the heat sink insert.

13. The fuel cell column of claim 1, wherein the plurality of fuel cell stacks comprise solid oxide fuel cell (SOFC) stacks.

14. The fuel cell column of claim 13, wherein each of the SOFC stacks comprises a plurality of SOFCs separated by a plurality of interconnects.

15. The fuel cell column of claim 14, wherein each of the plurality of interconnects, the first end plate, and the second end plate comprises an alloy comprising 94 to 96 weight percent chromium, 4 to 6 weight percent iron, and zero to 1 weight percent of at least one of yttrium or yttria.

16. The fuel cell column of claim 15, wherein the least one heat sink insert comprises an alloy comprising 94 to 96 weight percent chromium, 4 to 6 weight percent iron, and zero to 1 weight percent of at least one of yttrium or yttria.

17. The fuel cell column of claim 16, wherein the least one heat sink insert is thicker than each of the plurality of the interconnects.

18. The fuel cell column of claim 1, wherein the at least one heat sink insert has a length dimension that is greater than a respective length dimension of the adjacent fuel cell stacks, such that the at least one heat sink insert extends laterally out beyond side surfaces of the adjacent fuel cell stacks.

19. The fuel cell column of claim 18, further comprising ceramic baffle plates located on two sides of the column, wherein the at least one heat sink insert has a width dimension between the ceramic baffle plates that is the same as a respective width dimension of the adjacent fuel cell stacks between the ceramic baffle plates.

20. A fuel cell column, comprising:
a plurality of fuel cell stacks;
at least one fuel manifold configured to provide fuel to the plurality of fuel cell stacks; and
at least one heat sink insert located between adjacent fuel cell stacks of the plurality of fuel cell stacks, wherein:
the adjacent fuel cell stacks comprise a first fuel cell stack located above a second fuel cell stack;
the first fuel cell stack comprises a first end plate located at a bottom of the first fuel cell stack;
the second fuel cell stack comprises a second end plate located at a top end of the second fuel cell stack, wherein the first end plate and the second end plate are composed of the same material;
the at least one heat sink insert comprises a first heat sink insert which is located between the first end plate of the first fuel cell stack and the second end plate of the second fuel cell stack;
the first heat sink insert has a first major surface that physically contacts the first end plate of the first fuel cell stack and a second major surface that physically contacts the second end plate of the second fuel cell stack; and
the first heat sink insert comprises first and second separate pieces separated by an expansion zone.

* * * * *